United States Patent Office 2,702,807
Patented Feb. 22, 1955

2,702,807
NEW CLASS OF HALO-PHTHALIDES AND METHODS OF PREPARING THE SAME

Brian L. Hutchings, Pearl River, N. Y., assignor to American Cyanamid Company, New York, N. Y., a corporation of Maine No Drawing. Application May 3, 1952,
Serial No. 286,022

3 Claims. (Cl. 260—343.3)

This invention relates to new phthalide compounds and methods of making the same. More particularly this invention relates to certain new halo-phthalides which can be represented by the following general structural formula:

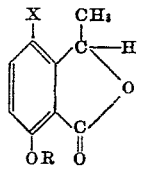

in which R represents hydrogen or a lower alkyl radical and X represents halogen.

The new compounds of this invention are crystalline solids useful in many fields of organic chemistry. For instance, the new compounds can be treated with potassium permanganate in basic aqueous solution followed by acidification of the oxidized solution to produce the corresponding halo-phthalic anhydride compounds, which in turn are useful as intermediates in the preparation of novel polyester resins. It is not intended, however, that the above procedure constitute a part of the present invention since the halo-phthalic anhydrides resulting from such a method constitute part of the subject matter of copending U. S. application S. N. 286,024, filed concurrently herewith. The new compounds of this invention can also be treated with potassium permanganate in neutral solution to give compounds having antiseptic properties as disclosed in copending U. S. application S. N. 286,023, filed concurrently herewith. In fact, the new compounds of this invention possess antiseptic and fungicidal properties per se and can be employed in compositions prepared for this purpose.

While it is not intended that this invention be limited to the above new class of compounds when prepared by any one particular method, a new method of preparing these compounds has been discovered, and it is intended that this new method also constitute a part of the present invention. According to the new method of this invention, a 3-methyl-3-carboxy-4-halo-7-alkoxyphthalide or 3-methyl-3-carboxy-4-halo-7-hydroxyphthalide is decarboxylated by heating to produce the corresponding 3-methyl-4-halo-7-alkoxyphthalide or 3-methyl-4-halo-7-hydroxyphthalide. The new reaction may be more particularly illustrated by the following general equation:

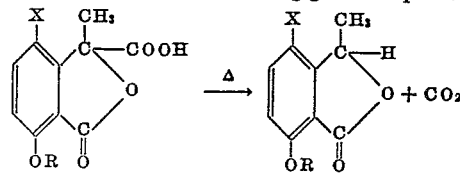

in which R and X are as previously defined.

The carboxy-phthalide compounds can be decarboxylated by simply heating in the absence of a solvent or a catalyst, or if desired, a decarboxylating agent and/or a high boiling inert solvent or diluent can also be employed. In the absence of a decarboxylating agent, decarboxylation takes place at a temperature of from about 160° C. to 200° C., or in other words, at about the melting point of the material. If a decarboxylating agent, for instance acetic anhydride or quinoline and copper is employed, somewhat lower temperatures are usually satisfactory. For instance, with acetic anhydride, temperatures as low as about 80° C. can be employed with the preferred range being from about 90° C. to the reflux temperature of the reaction mixture; and with quinoline and copper, temperatures of about 150° C. to the reflux temperature of the reaction mixture are satisfactory. The completion of the reaction is easily discernable since the decarboxylation results in carbon dioxide liberation, and when this carbon dioxide liberation ceases, the reaction is substantially complete.

The invention will be more particularly illustrated by the following examples in which all parts are by weight unless otherwise indicated.

Example I

One hundred milligrams of 3-methyl-4-chloro-7-methoxyphthalide-3-carboxylic acid, prepared by the procedure disclosed in copending U. S. application S. N. 286,021, filed concurrently herewith, were heated on an oil bath at 195° C.–210° C. for ten minutes. By this time the evolution of gas had ceased. After cooling, the resulting product was recrystallized from ethanol-water twice, yielding about 50 mgs. of 3-methyl-4-chloro-7-methoxyphthalide.

Other 3-methyl-4-halo-7-(lower alkoxy)phthalides or 3-methyl-4-halo-7-hydroxyphthalides are prepared by the procedure disclosed in the above example except that the appropriate 3-methyl-4-halo-7-(lower alkoxy)phthalide-3-carboxylic acid or 3-methyl-4-halo-7-hydroxyphthalide-3-carboxylic acid is employed as a starting material. For instance, 3-methyl-4-chloro-7-ethoxyphthalide is prepared by substituting an equal molar quantity of 3-methyl-4-chloro-7-ethoxyphthalide (prepared by the procedure of copending U. S. application S. N. 286,034, filed concurrently herewith) for the 3-methyl-4-chloro-7-methoxyphthalide-3-carboxylic acid employed in the above example, and 3-methyl-4-chloro-7-hydroxyphthalide is prepared by substituting an equal molar quantity of 3-methyl-4-chloro-7-hydroxyphthalide-3-carboxylic acid (also prepared by the procedure disclosed in the above-mentioned copending application) for the 3-methyl-4-chloro-7-hydroxyphthalide-3-carboxylic acid employed above. Other illustrative examples of compounds which are similarly prepared are 3-methyl-4-bromo-7-methoxyphthalide, 3-methyl-4-bromo-7-ethoxyphthalide and 3-methyl-4-bromo-7-hydroxyphthalide.

Example II

Thirty milligrams of 3-methyl-4-chloro-7-methoxyphthalide-3-carboxylic acid was dissolved in 10 cc. of acetic anhydride containing a few drops of pyridine. After 3 hours on the steambath the bulk of the acetic anhydride was removed by evaporation in vacuo. The residual acetic anhydride was decomposed with water and the product crystallized from ethanol-H₂O. After an additional crystallization from ethanol-water, there was obtained about 14 mgs. of 3-methyl-4-chloro-7-methoxyphthalide.

I claim:

1. The method of preparing compounds represented by the formula:

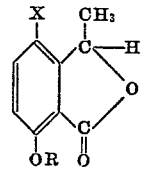

where X represents halogen and R represents a member selected from the group consisting of hydrogen and lower alkyl radicals, which comprises heating to a temperature sufficiently high to result in the liberation of carbon dioxide, a compound represented by the formula:

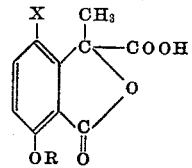

where R and X are as previously defined.

2. A method of preparing 3-methyl-4-halo-7-(lower alkoxy)phthalides which comprises heating a 3-methyl-4-halo-7-(lower alkoxy)phthalide-3-carboxylic acid to a temperature sufficiently high to result in the liberation of carbon dioxide.

3. The method of claim 2 where said heating is done in the presence of acetic anhydride.

References Cited in the file of this patent

UNITED STATES PATENTS

| 2,047,946 | Austin et al. | July 21, 1936 |
| 2,088,633 | Bousquet et al. | Aug. 3, 1937 |
| 2,150,595 | Austin et al. | Mar. 14, 1939 |